United States Patent [19]
Viola

[11] Patent Number: 6,137,640
[45] Date of Patent: Oct. 24, 2000

[54] PROGRAM CONTROLLED BEAM FOCUS TO COMPENSATE FOR THERMAL CHANGES

[75] Inventor: David P. Viola, Andover, Mass.

[73] Assignee: AGFA Corporation, Wilmington, Mass.

[21] Appl. No.: 09/293,952

[22] Filed: Apr. 19, 1999

Related U.S. Application Data

[62] Division of application No. 08/853,036, May 6, 1997, Pat. No. 5,936,717.

[51] Int. Cl.$^7$ ..................................................... G02B 7/02
[52] U.S. Cl. ............................. 359/820; 359/819; 355/53
[58] Field of Search .................................... 359/820, 819; 355/53

[56] References Cited

U.S. PATENT DOCUMENTS

| | | | |
|---|---|---|---|
| 4,236,790 | 12/1980 | Smith | 350/253 |
| 4,557,593 | 12/1985 | Iwanade | 355/57 |
| 4,660,094 | 4/1987 | Yoshimoto et al. | 358/285 |
| 4,834,477 | 5/1989 | Tomita et al. | 350/6.2 |
| 4,990,771 | 2/1991 | Minoura et al. | 250/236 |
| 5,436,692 | 7/1995 | Noguchi | 355/53 |
| 5,537,168 | 7/1996 | Kitagishi et al. | 353/101 |
| 5,663,554 | 9/1997 | Henry | 250/201.2 |
| 5,679,946 | 10/1997 | Mukai et al. | 250/201.2 |
| 5,886,728 | 3/1999 | Hamada et al. | 347/242 |
| 5,945,670 | 8/1999 | Rudeen | 250/235 |

OTHER PUBLICATIONS

Patent Abstracts of Japan vol. 018, No. 453 (M–1662) Aug. 24, 1994, & JP 06 143807 A (Ricoh Co Ltd), May 24, 1994 Japan.

Patent Abstracts of Japan vol. 097, No. 004, Apr. 30, 1997 & JP 08 329543 A (Ricoh Co Ltd), Dec. 13, 1996 Japan.

*Primary Examiner*—Scott J. Sugarman
*Assistant Examiner*—Tim Thompson
*Attorney, Agent, or Firm*—Alfred A. Standicki; Edward L. Kelley

[57] ABSTRACT

An imaging system with beam focus adjustment, includes an emitter which emits a beam of radiation along a beam path and an optical assembly, having a focus adjustment mechanism, configured to focus the emitted beam on a medium to be imaged. A medium support member supports the medium on its support surface during imaging. A sensor generates temperature data representing a detected temperature of the medium support member and a controller controls the focus adjustment mechanism in accordance with the temperature data to adjust the focus of the emitted beam on the medium.

29 Claims, 7 Drawing Sheets

PROGRAM CONTROLLED BEAM FOCUS TO COMPENSATE FOR THERMAL CHANGES

This application is a division of application Ser. No. 08/853,036 filed on May 6, 1997 now U.S. Pat. No. 5,936,717.

TECHNICAL FIELD

The present application relates to image reading and recording and more particularly to adjusting the focus of an optical imaging beam to compensate for focus errors caused by environmental conditions within the imaging system.

BACKGROUND ART

Modern imagesetters and platesetters utilize optical scanners to write or record images for subsequent reproduction or to read a prerecorded image at a predefined resolution rate. Such scanners may write or record images on or read prerecorded images from various media including photo or thermal sensitive paper or polymer films, photo or thermal sensitive coatings or erasable imaging materials, aluminum or other metal base printing plate, or other type media. The medium is typically mounted on an imaging surface which may be planar or curved and then scanned with an optical beam.

The primary components of modern imagesetting and platesetting systems include an image processor to generate and/or edit a digital image, and a raster image processor (RIP) for converting data signals from the image processor into signals which can be understood by a controller which controls the scanning of the optical beam by the imagesetter or platesetter.

The imagesetter or platesetter itself typically includes a scan assembly which is often supported so as to be movable within a drum cylinder in which the recording or recorded medium is mounted. The controller, in accordance with the signals from the RIP and its own programmed instructions, generates signals to control the optical scanning so as to write images on or read images from the medium mounted within the drum cylinder by scanning one or more optical beams over the inside circumference of the drum cylinder while the cylinder itself remains fixed.

A typical scan assembly of a cylindrical drum type imaging system includes a radiation source such as a laser diode or other optical beam generator, one or more lenses to precisely focus the optical beam onto an image plane via a spin mirror or other optical device which scans the light beam over the inside circumference of the drum cylinder, as will be well understood by those skilled in the art.

High resolution imagesetters and platesetters require precise focusing to obtain output images free of undesirable artifacts generally known as banding and dot gain/loss. Banding and/or dot gain can result from small variations in beam spot size on the material or image receiving surface. Even though a slight deviation in the system focus may not have a significant effect on the beam spot size at the image receiving surface, variation of spot size caused by dynamic variations of focus produces visible artifacts on the output image. If the system focus error is eliminated, the affect of the dynamic variations of focus is minimized and a source of banding accordingly reduced.

Large format imagers have difficulty maintaining focus because of changes in the temperature in the support members to which optical system components and the media to be imaged are mounted. In conventional imaging systems, the focus is set at the factory or during initial installation, or during initiation of operations. The focus is preferably established based upon the normal operating temperature of the imaging system; however, the actual operating conditions may differ from what might generally be characterized as normal operating conditions due to the general environmental conditions in which the imaging system is operating. Further, the normal operating conditions will typically change as the imaging system ages. Further still, certain components of the scanning assembly may be replaced during the life of the imaging system and the new components may react differently at the normal operating conditions than did the replaced components. Additionally, the imaging system may be operated from time to time immediately after start up, and therefore imaging may be performed prior to the system actually reaching its normal operating condition. Any of these conditions can result in a system focus error which will cause a significant degradation in the quality of the imaging.

Recently, mechanisms have been developed which allow for dynamic adjustment of the system focus within imagesetting and platesetting systems. For example, U.S. application Ser. No. 08/373,712, which is commonly assigned to the assignee of the present application, discloses a focus mechanism which allows real time focus adjustment in optical imaging systems. As described therein, the adjustment mechanism allows precise adjustment of the focus for various thicknesses of imaging material. However, a need remains for an imaging system in which the optical beam focus is adjusted to correct for focus errors caused by variations in the system operating conditions.

OBJECTIVES OF THE INVENTION

It is an objective of the present invention to provide an imaging system in which focus errors caused by varying temperature conditions within the imaging system are automatically corrected.

It is another object of the present invention to provide an imaging system that maintains a desired focus notwithstanding the ambient conditions in which the imaging system is operating.

It is a further object of the present invention to provide an imaging system in which the system focus can be adjusted in real time such that high quality imaging can be properly performed prior to the system reaching its normal operating condition.

It is yet another object of the present invention to provide an imaging system in which the focus is automatically adjusted to account for changes in the normal operating condition of the system due to use and aging.

Additional objects, advantages, novel features of the present invention will become apparent to those skilled in the art from this disclosure, including the following detailed description, as well as by practice of the invention. While the invention is described below with reference to a preferred embodiment (s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, an imaging system includes an emitter, such as a laser diode or gas laser or the end of an optical fiber, for emitting a beam of radiation along a beam path. An optical assembly, such as a lens, assembly of lenses or other optical element arrangement, focuses the emitted beam on a medium to be imaged. The system also includes a focus adjustment mechanism which, for example, may be part of the optical assembly. A medium support member, e.g. an internal cylindrical drum support, a rotating drum or a planar support, having a support surface which supports the medium during imaging. A sensor is provided to generate temperature data representing a detected temperature of the medium support member. The temperature data is transmitted to a controller which controls the focus adjustment mechanism in accordance with the temperature data to adjust the focus of the emitted beam on the medium.

The support surface is disposed along the beam path and will initially be at an initial distance from the emitter. This distance may, for example be a distance preset at the factory or during installation or relate to a particular positioning of the support surface and emitter at some point during system operation. At the detected temperature of the medium support member, the support surface will be at a different distance from the emitter due to the thermal characteristics of the medium support member. That is, because of the change in the temperature of the medium support member, the support member will expand or contract based upon its thermal coefficient of expansion. The distance from the support surface to the emitter along the beam path will therefore change and this change will result in a focus error at the medium which is to be imaged. Hence, the amount and direction of the adjustment of the focus will correspond to the difference between the initial and current distances.

In accordance with other aspects of the invention, an optics support member, which could for example be part of the carriage structure in an internal drum type imagesetter or platesetter, supports the optical assembly so as to be distanced from the emitter and the medium support member. A second sensor is provided to generate temperature data representing the detected temperature of the optics support member. The controller utilizes this data along with the temperature data from the medium support member sensor to control the focus adjustment mechanism in accordance with the received temperature data to adjust the focus of the emitted beam on the medium.

The support surface of the medium support member will initially be at one distance from the optical assembly and at a different distance from the optical assembly at the detected temperatures of the optics support member and medium support member, due to the thermal characteristics of both the optics support member and medium support member. Accordingly, the amount and direction of the adjustment of the focus in this case will be made to correspond to the difference between the distances.

In accordance with yet other aspects of the invention the radiation emitter has a housing, which may also serve as a heat sink for the radiation source. Another sensor is mounted to the housing to generate further temperature data representing the detected temperature of the housing. This temperature data is transmitted to the controller. In this case, the controller can be further adapted to control the focus adjustment mechanism in accordance with the temperature data associated with the medium support member, the optics support member and the emitter housing to properly adjust the focus of the emitted beam on the medium.

It will be appreciated by those skilled in the art that if the temperatures of the support members and housing change, the distances between the medium support surface and the emitter and between the optical assembly and the emitter and support surface will change accordingly due to the thermal characteristics of the respective elements. If the focus has been set based upon an actual or assumed temperature of each element which is different than a detected temperature, the amount and direction of the adjustment of the focus should correspond to the change in the distances between the emitter and the medium support surface and between the emitter or support surface and the optical assembly resulting from the change in temperatures. The changes in these differences can be easily computed in a well known manner using the respective thermal coefficient of expansion for each applicable element. Of course, only those of the support members and housing which experience a temperature change will need to be considered in the adjustment computation. It should be appreciated that rather than making adjustment computations in real time, a prestored look-up table with pre-computed adjustment data for different combinations of temperature data, could be used to determine the required adjustment direction and amount.

In its simplest form, the focus of a beam of radiation emitted along a beam path by a beam emitter which is initially positioned a distance from a medium support member, with the medium support member at or assumed to be at an initial temperature, is adjusted by sensing the actual temperature of the medium support member and adjusting the beam focus of the emitted beam in accordance with the sensed temperature of the medium support member. If the radiation beam passes through a focussing device supported by a focus device support member, the focusing device will be positioned between the emitter and the medium to be imaged at a distance from the emitter with the support member at or assumed to be at an initial temperature. The actual temperature of the support member can be sensed and the beam focus also adjusted in accordance with the sensed temperature of the focus device support member. This may, for example, include controlling the operation of the focus device itself. Further still, if the emitter has a housing, the initial distance from the emitter to the medium support member will also be set based upon the housing being at or assumed to be at an initial temperature. The actual temperature of the emitter housing can be sensed and the beam focus also adjusted in accordance with the sensed temperature of the housing.

The above described technique is readily implemented by computer programming stored on a storage medium, such as a read on memory (ROM). The stored computer programming can be read from the computer readable storage medium by a computer to cause the computer to operate so as to receive signals from the one or more temperature sensors, to process the received signals so as to generate a correction signal for adjusting the beam focus to correspond to the sensed temperatures, and to transmit the correction signal, responsive to which the focus device operates to adjust the beam focus.

BEST MODE FOR CARRYING OUT THE INVENTION

Figure 1:
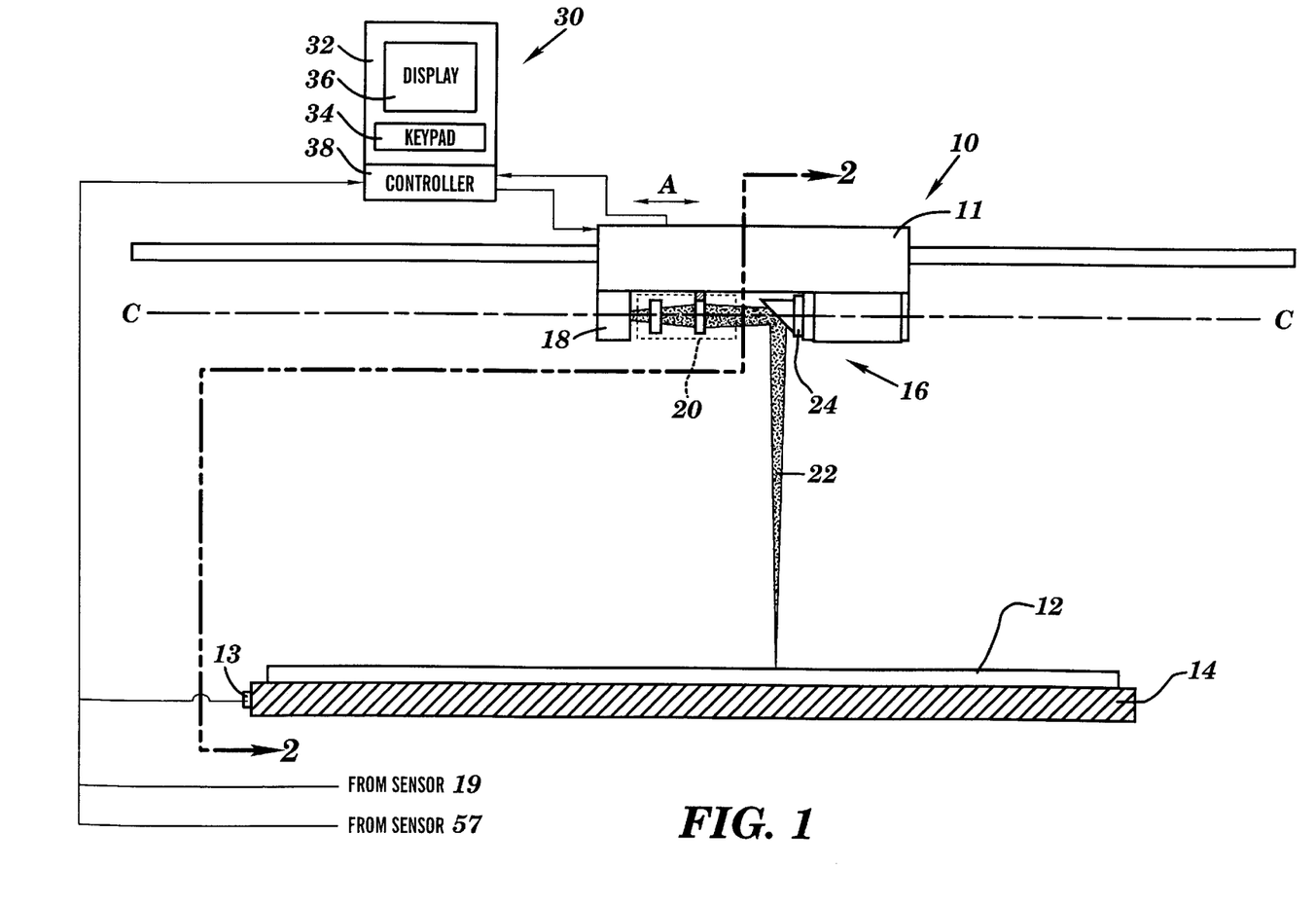
FIG. 1 is a side view of a scan assembly of a cylindrical drum type imaging system in accordance with the present invention.
Figure 2:
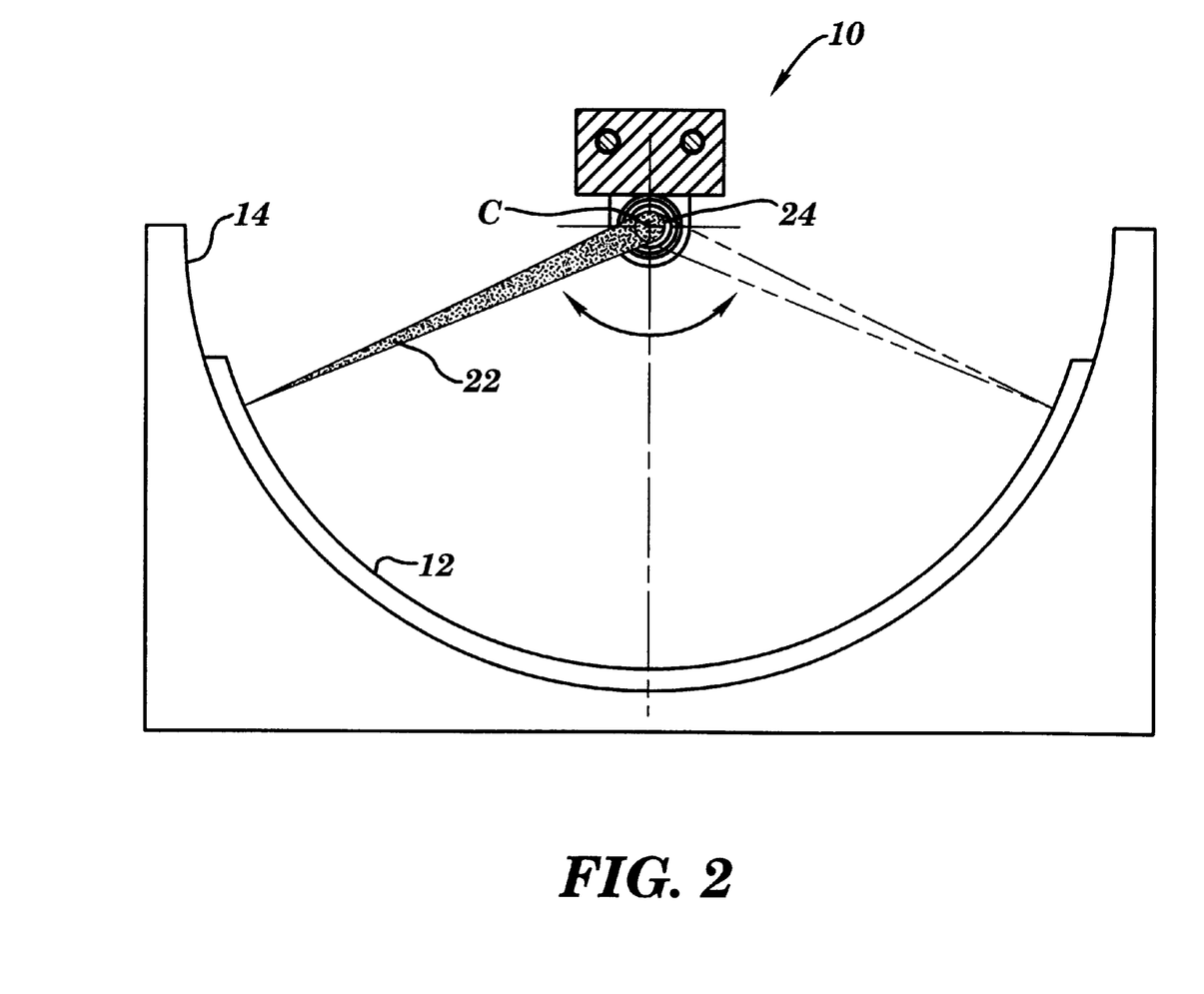
FIG. 2 is a sectional view of the scan assembly of FIG. 1.

Referring to FIGS. 1 and 2, an imaging system having a scan assembly 10, a photosensitive or radiation sensitive recording material 12 on a support surface of a cylindrical drum platen 14 typical of known imagesetting devices, and a control system 30, is shown. The scan assembly 10 includes a light or radiation source, such as a laser, in a metal housing 18 mounted a fixed distance away from the support surface of the cylindrical drum 14. A lens assembly 20 is located between the light source in housing 18 and the support surface of drum 14 for focusing a beam 22 emitted by the light source mounted in housing 18 onto the material 12. A beam deflecting apparatus 24, which is shown to be a spin mirror but could be otherwise, line-wise scans the beam 22 across the material 12 supported by the support surface of the cylindrical drum 14.

Relative motion between the scan assembly 10 and the material 12 is facilitated by carriage 11 which is synchronized by electronic control signals from the is control system 30 to line-wise scan the beam 22 onto the material 12 on the support surface of drum 14 to form the image. In a capstan type imaging system the carriage typically includes a roller to move the material relative to the support surface during scanning. In the drum type imaging system depicted, the carriage 11 is moved along the axis C—C of the drum 14 by a precision linear drive mechanism while the material 12 remains motionless.

It will be appreciated by those skilled in the art that the photosensitive material can be replaced by a previously image material to achieve input or read scanning in a similar manner by collecting and sensing the light reflected from or transmitted through the previously imaged material. It will also be understood that the following description of the present invention is equally applicable to reading previously exposed images from a recorded material.

It will also be recognized by those skilled in the art that other optical elements, e.g. mirror, holographic, diffractive, binary, and/or gradient index, could be included as part of the lens assembly 20 for focusing the laser beam onto the material. Further, the lens assembly 20 may be located before or after the beam deflecting apparatus 24.

Referring to FIG. 1, the control system 30 includes a control panel 32 in which a keypad 34 and display 36 are disposed. The control system 30 also includes a controller 38 which receives image signals from a raster image processor (not shown) and issues signals to the scan assembly 10 to drive the scanning of the beam 22 to form the image on the material 12. The controller 38 also receives signals from temperature sensors mounted within the imaging system and processes these signals to generate control signals to a dynamic focus adjustment assembly which is included as part of the lens assembly 20, as will be detailed further below. As shown in FIG. 1, a temperature sensor 13 is mounted to the drum 14 and interconnected by a communications line to controller 38.

Figure 3A:
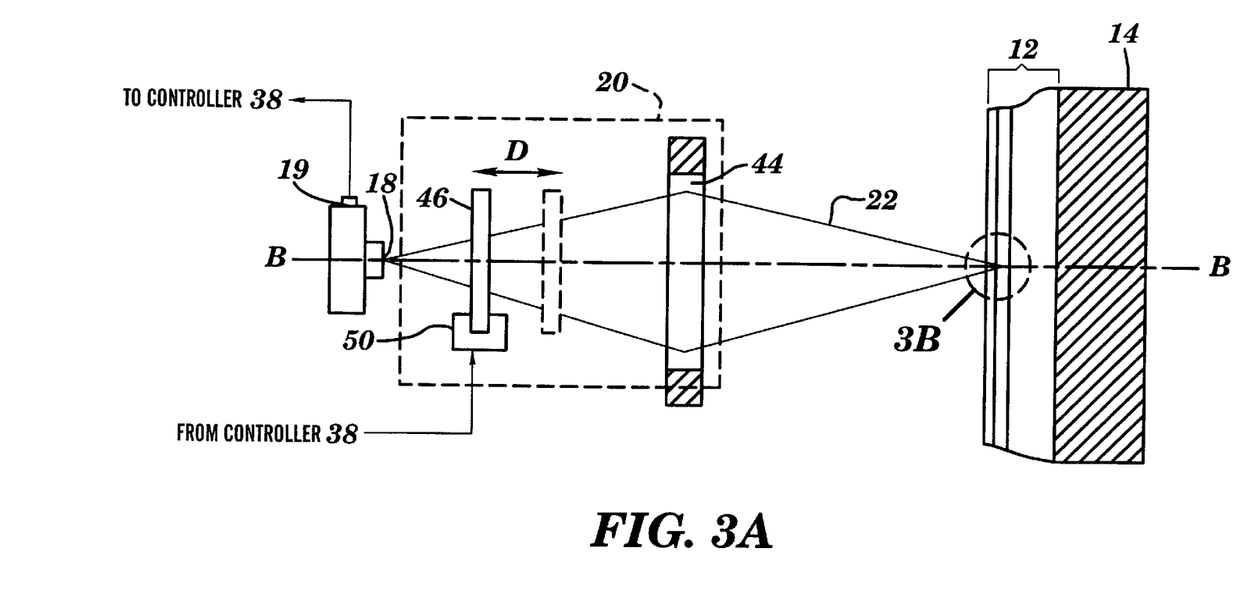
FIG. 3 is a more detailed view of portions of the optical system of the scan assembly depicted in FIG. 1.
Figure 3B:
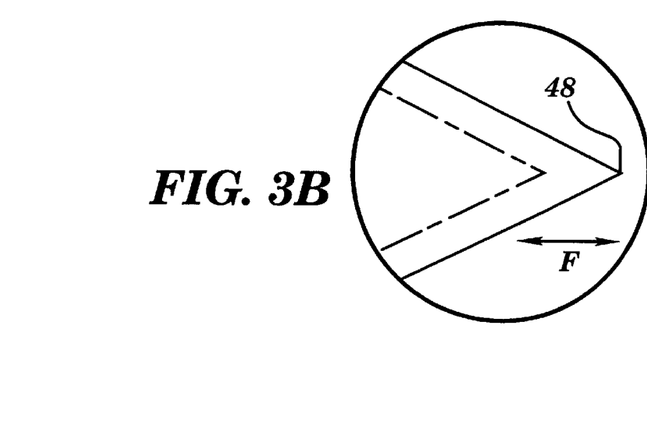

As shown in FIG. 3, the lens assembly 20 is located between the light source in housing 18 and the support drum 14. The assembly 20 has a fine focusing mechanism to focus the beam 22 at the image receiving surface or photosensitive layer of the material 12 by precise adjustment of the focus point 48 of the light source in housing 18. Precise focus adjustment is beneficial in reducing sources of banding artifacts in the final output image. The lens assembly 20 has a fixed lens 44 in the beam path for focusing the beam 22. That is, lens 44 is fixed in position relative to the light source mounted in housing 18 and to the support drum 14. A moveable lens 46 in the beam path is adjustable longitudinally along the optical axis B—B with respect to the fixed lens 44. The movable lens 46 is a weak lens of long focal length relative to the fixed lens 44. The weak lens 46 can be a positive lens or a negative lens and can be positioned in the beam path before, after, or within the fixed lens 44. Either or both lenses can be constructed using several lens elements as a lens group or groups.

Because of the relatively long focal length of the movable lens 46, a relatively large displacement of the lens 46 along the optical axis B—B will effect a relatively small change in the focal point 48 of the combined fixed and movable lenses and hence of the entire lens assembly 20. Accordingly, a longitudinal displacement of the weak lens 46 along the beam path produces a significantly smaller longitudinal displacement of the laser beam source image or beam focus point 48 at the image surface.

As shown in the exploded view of the beam position, the displacement of the focus point 48 indicated by arrow F due to the adjustment of the weak lens 46 position is much smaller than the lens 46 displacement D. Accordingly, an inexpensive and simple fine adjustment mechanism 50 can be used to facilitate the displacement of the second lens 46 within the lens assembly 20. Due to the long focal length of the weak lens 46, any lateral displacement of the weak lens 46 in a direction generally perpendicular to the optical axis B—B produces negligible effects on the optical system performance and alignment. Therefore, a less precise drive mechanism 50 is required for positioning the weak lens while tight constraints are maintained on the lateral position of the beam focus point 48 at the image surface.

Beneficially, both the weak lens 46 and the adjustment mechanism 50 are inexpensive, enabling easy and low cost focus adjustments. It will be recognized by those skilled in the art that if the weak lens is placed in a diverging or converging beam, the design of the weak lens can be constrained such that the presence or absence of the weak lens at some longitudinal position along the optical axis may not affect the focus of the lens assembly.

The fine focusing mechanism is readily controlled by the controller 38. The controller 38 controls the focus lens 46 position by determining the required focus lens position based upon sensed temperature data as will be detailed below. It will be noted that in FIG. 3, the light source housing 18 has a temperature sensor 19 affixed thereto. The sensor 19 is connected to the controller 38 by a communications line as indicated in FIGS. 1 and 3. The controller 38 signals the adjustment mechanism 50 to adjust the focus lens position longitudinally along the beam axis.

Referring to FIG. 4, a preferred embodiment of an adjustment mechanism of lens assembly 20 will be described. The weak leans 46 is mounted in a lens holder 52 that is supported by two parallel leaf springs 54, one on each side of the lens holder 52. The leaf springs 54 are attached to a plate 56, which forms part of the carriage 11, and to the lens holder 52 by screws 58 or by other suitable means. The lens holder 52 has a rigid screw 64 rotationally fixed within a through bore 62. A rotatable nut 60 engages the screw 64 to displace the lens mount 52 longitudinally upon rotation of the nut 60 by a mini-motor 66. The screw 64 can be driven linearly, either forward or reverse, to displace the weak leans 46 closer to or further away from the first lens 44. Preferably, the nut 60 is slightly oversized to allow for the angling of the screw 64 during movement of the mount 52.

A longitudinal rectangular protrusion 68 on the lens holder 52 cooperates with a longitudinal rectangular groove 70 in the plate 56 to guide the lens mount 52 longitudinally during movement of the lens mount 52 and maintain the lens 46 substantially perpendicular to the beam axis B—B. The leaf springs 54 bend as the lens mount 52 undergoes longitudinal movement, causing some transverse or lateral displacement of the weak lens 46 relative to the beam axis B—B. Due to the long focal length of the weak lens 46, the effects of any transverse displacement of the weak lens 46 are negligible for the optical system.

Figure 4A:
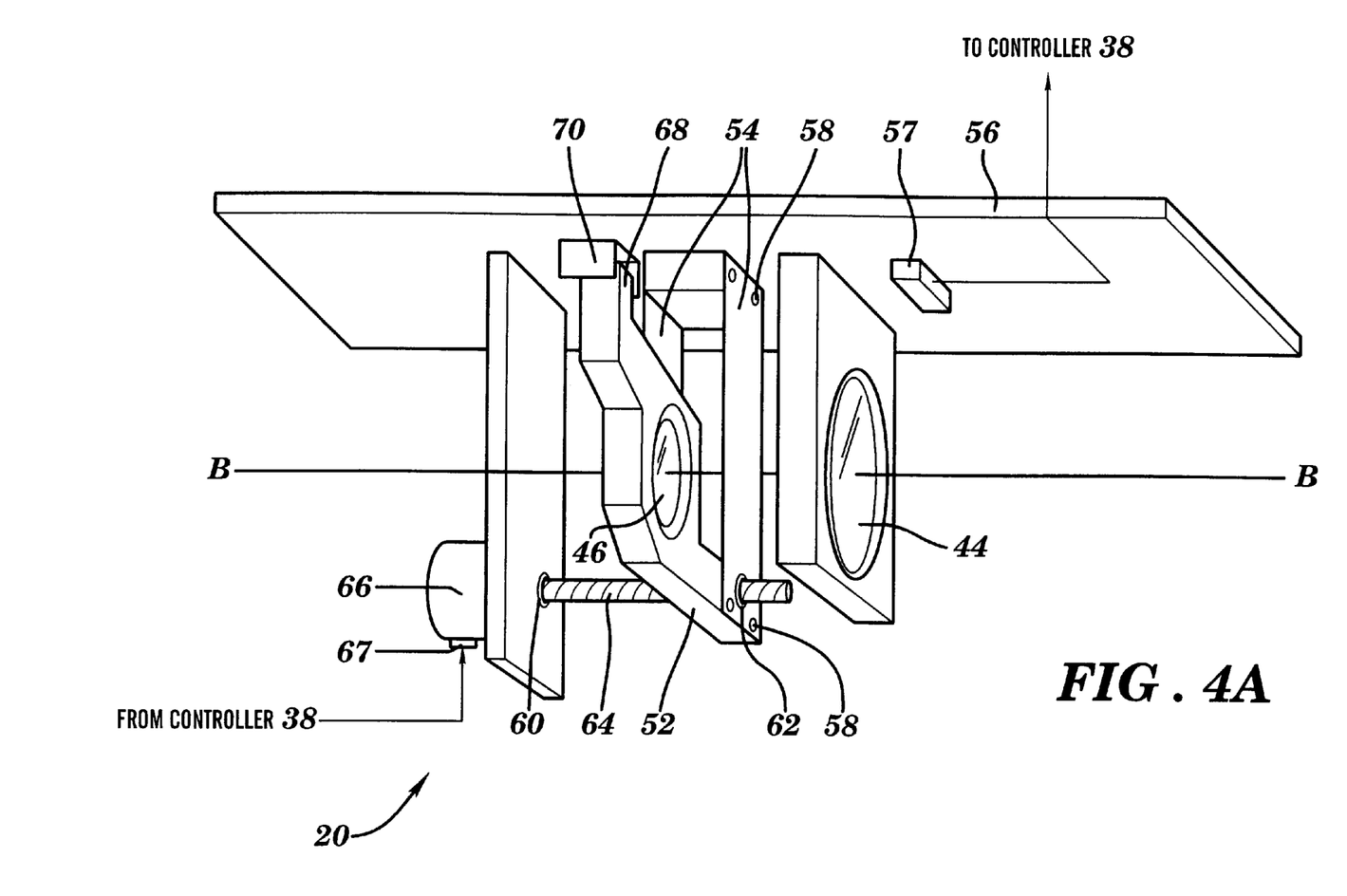
FIG. 4A is a perspective view detailing another embodiment of the lens adjustment mechanism depicted in FIG. 3.
Figure 4B:
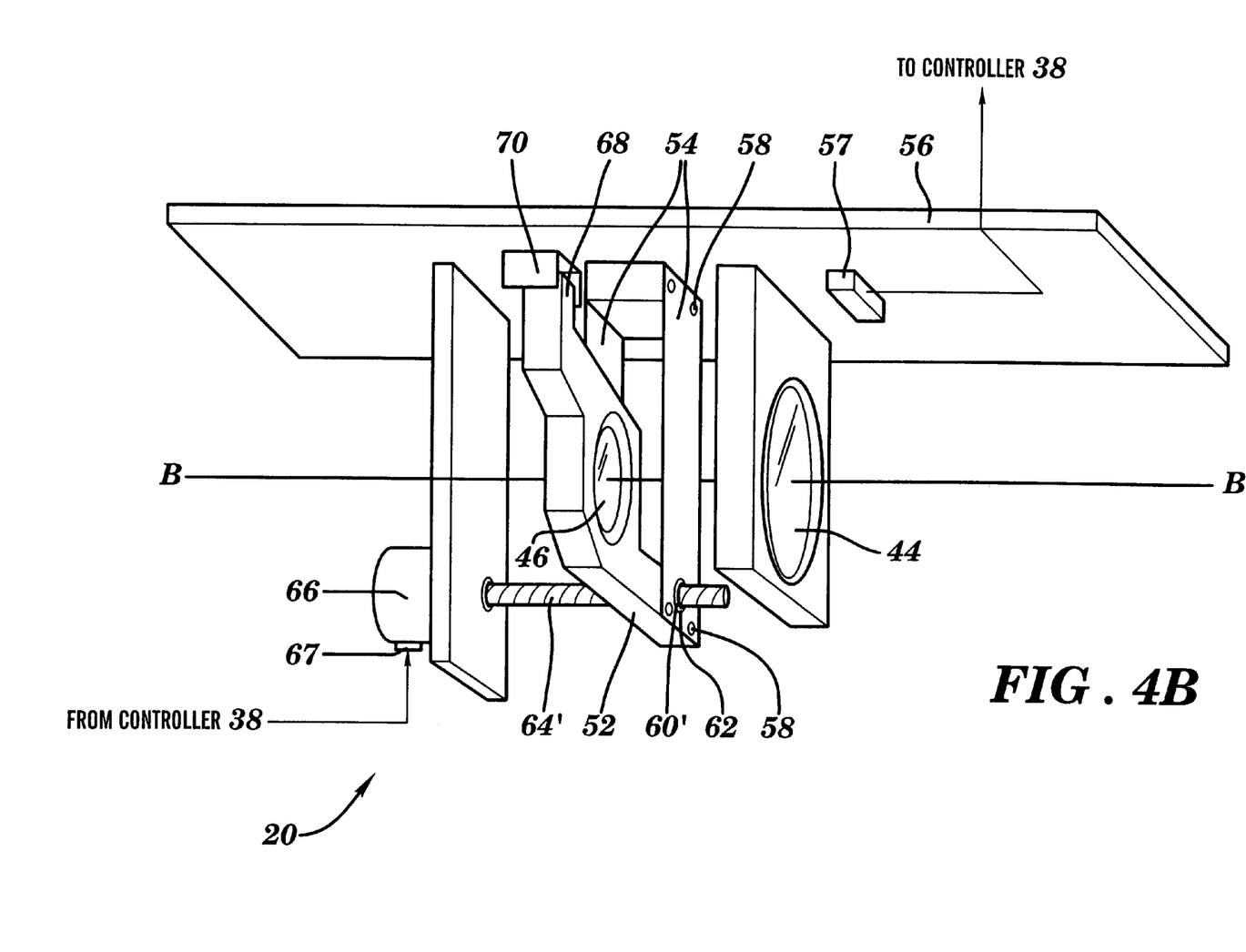
FIG. 4 is a perspective view further detailing a preferred embodiment of the lens adjustment mechanism depicted in FIG. 3.

Referring now to FIG. 4A, another embodiment of an adjustment mechanism of lens assembly 20 will be described. The weak lens 46 is mounted in a lens holder 52 that is supported by two parallel leaf springs 54, one on each side of the lens holder 52. The leaf springs 54 are attached to a plate 56, which forms part of the carriage 11, and to the lens holder 52 by screws 58 or by other suitable means. The lens holder 52 has a nut 60' rotationally fixed within a through bore 62. A flexible screw 64' engages the nut 60' to displace the lens mount 52 longitudinally upon rotation of the screw 64' by a mini-motor 66. The screw 64' can be driven either forward or reverse to displace the weak lens 46 closer to or further away from the first lens 44.

A longitudinal rectangular protrusion 68 on the lens holder 52 cooperates with a longitudinal rectangular groove 70 in the plate 56 to guide the lens mount 52 longitudinally during movement of the lens mount 52 and maintain the lens 46 substantially perpendicular to the beam axis B—B. The leaf springs 54 bend as the lens mount 52 undergoes longitudinal movement, causing some transverse or lateral displacement of the weak lens 46 relative to the beam axis B—B. Due to the long focal length of the weak lens 46, the effects of any transverse displacement of the weak lens 46 are negligible for the optical system.

It will be understood by those skilled in the art that other optical elements, such as mirror, holographic, diffractive, binary, gradient index, etc., can replace or be combined with the fixed lens for focusing the beam onto the material, and other optical elements can replace or be combined with the movable lens to be adjustable relative to the fixed elements, provided that the combination of the adjustable optical elements has a combined focal length that is comparatively longer than the combined focal length of the fixed optical elements. Further, the lens assembly 20 could, if desired, be located downstream of the beam deflecting apparatus 24. Elements performing the function of a lens for electromagnetic or particle beam radiations are within the scope of the invention. It will be appreciated that a variety of mechanisms can be used to displace the weak lens with respect to the fixed lens without departing from the spirit of the invention.

A control switch 67 is provided on the motor 66 and interconnected to the controller 38 to receive control signals from the controller 38 to control the operation of the motor 66 to drive the desired amount of displacement of the weak lens 46 by the adjustment mechanism 50 in the desired direction. It should be noted that a thermal sensor 57 is disposed on the carriage plate 56 which is interconnected to the controller 38 such that signals representing the sensed temperature of the support plate 56 can be transmitted to the controller 38 for processing.

Figure 5:
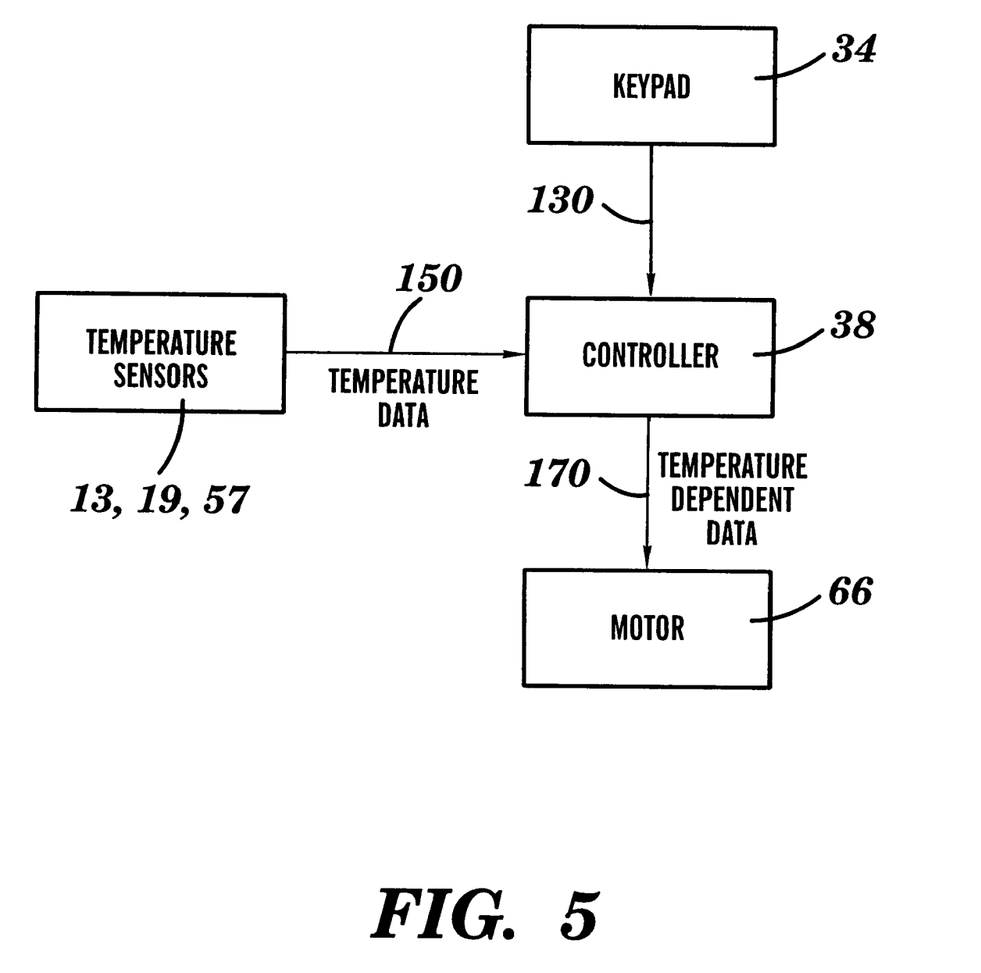
FIG. 5 is a block diagram indicating the flow of selected input and output signals to and from the controller of FIG. 1 in accordance with the present invention.

The operation of the imaging system depicted in FIGS. 1–4B will now be described with reference to FIG. 5. FIG. 5 is a block diagram of various components of the scan assembly 10 and control system 30 depicted in FIGS. 1–4B. Operation of the scan assembly is initiated by an operator entering predefined commands on the keypad 34 which are transmitted to the controller 38 via a communications link 130. Responsive to the received signals, the controller 38 initiates the powering up of the imaging system. This includes power distribution to the temperature sensors 13, 19 and 57 which immediately begin transmitting temperature data to the controller 38 via the communication link 150. The signals transmitted over link 150 represent the sensed temperature of the cylindrical drum 14, radiation source housing 18, and carriage support plate 58. The controller 38, as will be discussed further below, processes the temperature data received from the sensors 13, 19 and 57 to determine if the weak lens 46 is positioned such that the focus point 48 of the radiation beam 22 is properly focused on the medium.

More particularly, the temperature data transmitted to the controller 38 is processed by the controller 38 in accordance with the known thermal coefficients of expansion and geometric dimensions of the structural element to which the sensed data relates. For example, in the case of the cylindrical drum support 14, as the temperature of the cylindrical drum 14 increases the drum will expand and move the material 12 away from the radiation source mounted in housing 18. This will affect the focus of the beam 22 on the material, unless the weak lens 46 is displaced to adjust the focus point 48. Similarly, as the radiation source housing 18 increases in temperature, the radiation source point will be displaced along the beam path towards or away from the material 12. This will also result in a mispositioning of the focus point 48 at the material 12.

Still further, because the separation distances between the radiation source mounted in housing 18 and the lens assembly 20 and the distance between the lens assembly 20 and the material 12 will vary due to thermal expansion of the carriage mounting plate 56, the temperature data transmitted to the controller 38 from the sensor 57 can be processed to determine the adjustment amount and direction required to offset any focus error caused by the relative displacement of the lens assembly 20 with respect to the radiation source and the material to be scanned.

Additionally, the relative displacement between the weak lens 46 and the fixed lens 44 will also vary due to the thermal expansion of the support plate 56. Accordingly, the processor will also utilize the temperature data received from sensor 57 to compute an amount of adjustment of the weak lens which is required to offset the relative displacement between the lenses 44 and 46 due to thermal expansion of the plate 56.

The computation of the respective changes in the relative positioning of the various optical components along the radiation beam path due to the combined effects of temperature changes in the respective support and housing elements is performed in the conventional manner and involves merely routine computation using well known engineering formulas. It will be well understood by those skilled in the art that this computation will determine the required total adjustment amount for the weak lens 46. After determining the required adjustment amount and direction, the controller 38 generates and transmits a signal via the communication link 170 reflecting temperature dependent data to the motor 66 by way of the motor switch control 67. Responsive to this signal the motor 66 drives the nut 60 or screw 64' to displace the weak lens 46 in the desired amount and direction to place the focus point 48 at the desired positioning on the material 12. As shown, the system operates on a real time basis and accordingly, the weak lens is automatically adjusted to account for temperature variations in the radiation source housing 18, cylindrical drum support 14, and carriage plate 56. If desired, certain thresholds could be stored within the controller such that adjustment will only occur if the thermal conditions of the housing 18, support 14 and carriage 56 result in a displacement of the focus point 48 greater than an acceptable amount. As discussed above the adjustment amounts could be precalculated and stored in a look-up table residing in the controller 38 such that when respective combinations of temperature data are received, the controller need only use the stored look-up table to determine the direction and amount of the required displacement to properly adjust the focus point 48. Alternatively, a simple algorithm can be utilized by the controller, as will be well understood by those skilled in the art, to determine the required weak lens adjustment direction and the required amount of displacement to properly position the focus point 48.

It will also be appreciated that additional temperature sensors could be added and may be necessary if additional optical components are included in the imaging system. Further, to provide even more precise temperature information, additional sensors could be utilized at multiple locations on each of the relevant temperature sensitive elements within the system. For example, sensors could be placed on the carriage plate 56 between the motor 66 and weak lens 46 and between the weak lens 46 and fixed lens 44. Additionally, multiple temperature sensors could be placed on the housing 18 and drum support 14 and the temperature data averaged to provide more precise temperature data for use in computing or otherwise determining the necessary displacement amount of the weak lens to properly position the focus point 48. Additionally, it will be recognized that if desired, one or more sensors could be eliminated although this will result in a less precise focus adjustment.

It is preferable that the sensed temperature data utilized to determine any focus error and to cause the necessary lens assembly adjustment be that received by the controller just prior to imaging to ensure proper focusing of the imaging system. If desired, the temperature data could be polled prior to the imaging of each sheet of material or at some clocked sequence.

Figure 6:
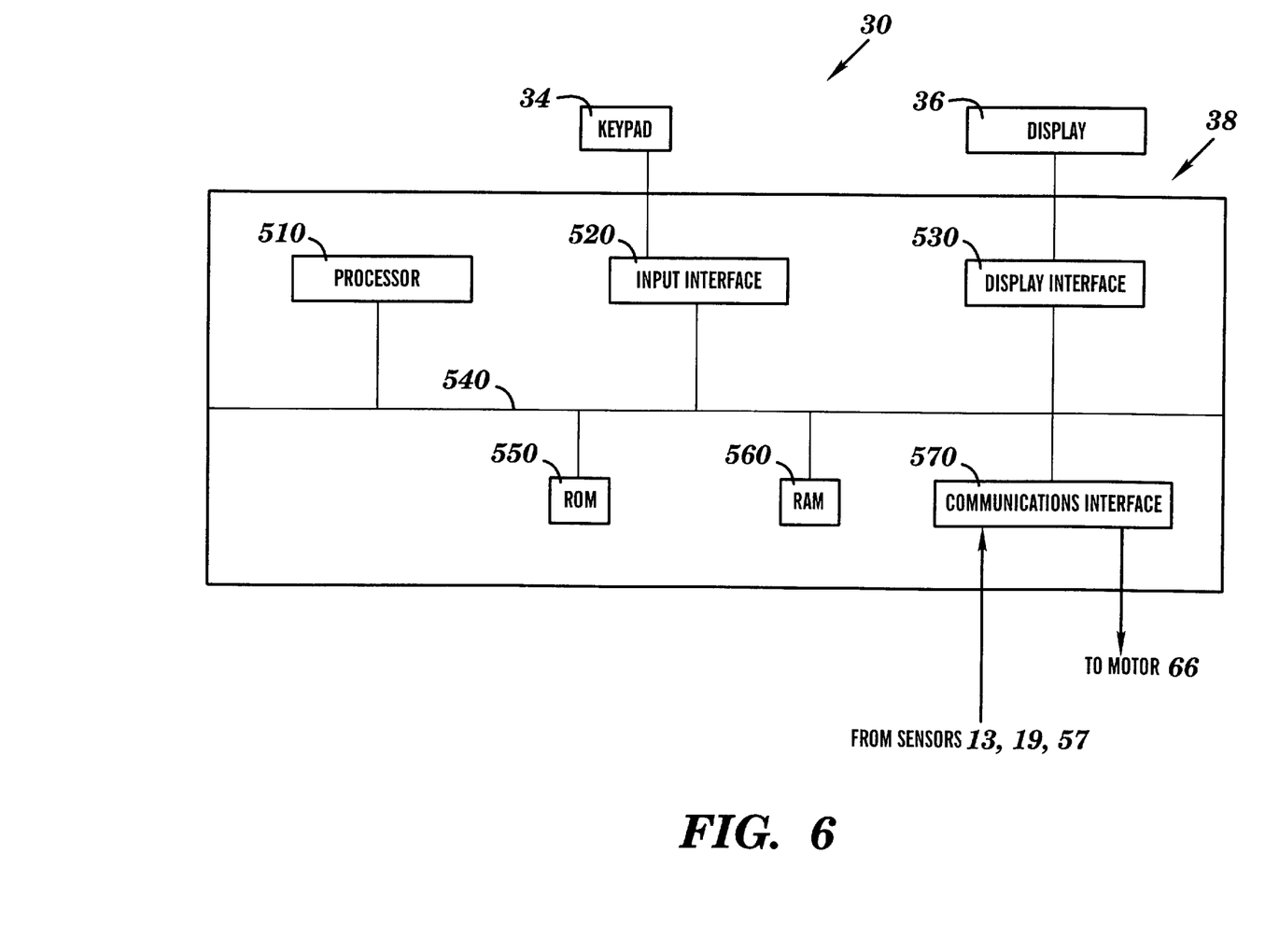
FIG. 6 is a simplified block diagram of the FIG. 1 controller in accordance with the present invention.

FIG. 6 shows a somewhat simplified depiction of the control system 30. As shown in FIG. 6, the controller 38 includes a digital processor 510 which could, for example, be a Pentium™ processor. Any commercially available keypad 34, or other input device could be utilized. The display 36 is a commercially available monitor. Preferably, the control system 30 is assembled from commercially available hardware components. The uniqueness of the controller 38 resides in the software instructions which are stored on its read only memory (ROM) 550.

In addition to the processor 510 and ROM 550, the controller 38 includes a communication interface 570 for communicating with the temperature sensors 13, 19 and 57, and the motor 66. It will be recognized by those skilled in the art that the communications interface 570 will also interconnect with other imaging system components in the convention manner and for the conventional purposes. The communications to the motor 66 include those communications necessary to direct the movement of weak lens 46 laterally to adjust the positioning of the focus point 48 due to focus errors caused by thermal conditions within the imaging system.

An input interface 520 provides an interface to the keypad 34 and a display interface 530 provides an interface to the display 36. A random access memory (RAM) 560 is provided to temporarily store data and the controller's programmed instructions which will be utilized by the processor 510 during system operations. A bus 540 conveys signals between the various components within the controller 38 in the customary fashion. It will be recognized that the development of the programming instructions stored on the ROM 550 to instruct the processor 510 to operate as described herein is a matter of routine programming effort and can be easily accomplished by one skilled in the art without undue effort. Because the controller 38 is configured in the customary manner using conventional components, the general operation of the controller 38 will not be described except to the extent relevant to the specific programmed operation of the controller 38 in accordance with the present invention.

To initiate operations, an operator enters predefined commands on the keypad 34 or other operator input device. The entered commands are received by the input interface 520 and transferred via bus 540 to the processor 510. The processor 510, in accordance with programmed instructions stored on ROM 550 directs the transfer of the appropriate programming from the ROM 550 to the RAM 560 via the bus 540 for use during the operational period. In accordance with the stored programmed instructions, the processor 510 generates a signal to the communications interface 570 via bus 540 which will be communicated by the communications interface 570 to power up the imaging system.

The powering up of the system includes, generally, the powering of the temperature sensors 13, 19 and 57 and the motor switch control 67. If desired, the processor 510 in accordance with the stored programmed instructions may generate a further signal to the motor control switch 67 via the communications interface 570 to direct the motor 66 to drive an initial adjustment in the positioning of the weak lens 46. Alternatively, at the end of each operating period, the processor 510, in accordance with its programmed instructions, may generate a signal which is transmitted via the communications interface to the motor switch 67, directing a motor 66 to position the weak lens in a predefined parked position. In a still further alternative, the current position of the weak lens at the end of each operating session could be stored in the RAM 560 and utilized during the subsequent operation of the system in determining the displacement amount required to properly position the focus point 48 in view of the temperature data received from the sensors 13, 19 and 57.

In any event, once the imaging system is in operation, the sensors 13, 19 and 57 transmit temperature data representing the sensed temperature of the respective components to which the sensors are mounted to the processor 510 via the communication interface 570 and bus 540. The processor 510, in accordance with its stored programmed instructions, determines or computes as has been discussed above, the amount and direction of any adjustment required in the weak lens 46 positioning to properly position the focus point 48 on the material 12. As described above, the processor 510 may perform this determination or computation on a continuous basis or during particular time intervals or based upon the timing of relevant operational activities of the imaging system, e.g., just prior to imaging on each new sheet of material.

The processor routinely monitors the received temperature data and automatically generates and transmits signals to the motor 66 to adjust the location of the weak lens 46 to properly position the focus point 48 on the material 12 based upon the received temperature data from the sensors. Accordingly, the system serves as a closed loop focus correction system for automatically correcting the focus of the radiation beam 22 on the material 12 in the real time.

As described in detail above, the present invention provides an imaging system in which focus errors caused by temperature conditions within the imaging system are automatically corrected. The described imaging system maintains a desired focus notwithstanding the ambient conditions in which the system is operating. The imaging system of the present invention is configured to change the beam focus in real time such that high quality imaging can be properly performed prior to the system reaching its normal operating condition. Further, in the described imaging system the focus is automatically adjusted to account for changes in the normal operating condition of the system due to use and aging.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. An article of manufacture for adjusting the focus of a beam of radiation emitted along a beam path by a radiation generator, the radiation beam being focussed by a beam focussing device disposed in the beam path and positioned between the radiation generator and a medium support member for supporting a medium to be imaged, the medium support member having a first temperature sensor mounted thereto, and the radiation generator being positioned a first distance from the medium support member with the medium support member at a first temperature, comprising:

computer readable storage medium; and computer programming stored on said storage medium;

wherein said stored computer programming is configured to be readable from said computer readable storage medium by a computer and thereby cause said computer to operate so as to:

receive a first signal from the first temperature sensor representing a second temperature of the medium support member which is different than the first temperature, process the first signal so as to generate a correction signal for adjusting the beam focus to correspond to the second temperature of the medium support member; and transmit the correction signals responsive to which the focus device operates to adjust the beam focus.

2. An article of manufacture according to claim 1, wherein the radiation generator has a housing, with a second temperature sensor mounted thereto, the radiation generator is positioned at the first distance from the medium support member with the medium support member at the first temperature and with the generator housing at a third temperature, and said stored computer programming is configured to be readable from said computer readable storage medium by the computer to thereby cause said computer to operate so as to:

receive a second signal from the second temperature sensor representing a fourth temperature of the generator housing which is different than the third temperature, process the second signal so as to generate the correction signal, wherein the correction signal is generated to further adjust the beam focus to correspond to the fourth temperature of the generator housing.

3. An article of manufacture according to claim 2, wherein the focus device is supported by a focus device support member, having a third temperature sensor mounted thereto, the focus device is positioned at a second distance from the radiation generator with the generator housing at the third temperature and the focus device support member at a fourth temperature, and said stored computer programming is configured to be readable from said computer readable storage medium by the computer to thereby cause said computer to operate so as to:

receive a third signal from the third temperature sensor representing a sixth temperature of the focus device support member which is different than the fifth temperature, process the third signal so as to generate the correction signal, wherein the correction signal is generated to further adjust the beam focus to correspond to the sixth temperature of the focus device support member.

4. An article of manufacture for adjusting the focus of a radiation beam emitted by a radiation generator at an imaging medium, comprising:

computer readable storage medium; and computer programming stored on said storage medium;

wherein said stored computer programming is configured to be readable from said computer readable storage medium by a computer and thereby cause said computer to operate so as to:

receive an information signal representing temperature information, process the received information signal to generate a control signal for controlling a focus element through which the emitted beam passes so as to correspond to the temperature information; and direct transmission of the control signal to the focus element.

5. An article of manufacture according to claim 4, wherein the imaging medium is supported during imaging by a support member, and the temperature information includes a temperature of the support member.

6. An article of manufacture according to claim 4, wherein the radiation beam emitted by the radiation generator has a housing, and the temperature information includes a temperature of the housing.

7. An article of manufacture according to claim 4, wherein the focus element is supported by a support member during imaging, and the temperature information includes a temperature of the support member.

8. An article of manufacture according to claim 4, wherein the received information signal is processed in accordance with an algorithm to generate the control signal.

9. An article of manufacture according to claim 4, wherein the processing of the received information signal includes accessing a look-up table to identify adjustment data corresponding to the temperature information and generating the control signal based on the identified adjustment data.

10. An article of manufacture according to claim 4, wherein the imaging medium is supported by a first support member during imaging, the radiation beam is emitted by a radiation generator having a housing, the focus element is supported by a second support member, and the temperature information includes a temperature of the first support member, a temperature of the housing and a temperature of the second support member.

11. An article of manufacture according to claim 4, wherein the focus element includes a lens and the control signal is for controlling a movement of the lens.

12. An article of manufacture according to claim 4, wherein the focus element includes a focus adjustment mechanism, and the transmission of the control signal is directed to the focus adjustment mechanism.

13. An article of manufacture according to claim 4, wherein the temperature information includes at least one detected temperature.

14. An article of manufacture according to claim 4, wherein the temperature information corresponds to an ambient temperature.

15. An article of manufacture according to claim 4, wherein the imaging medium is supported during imaging by a drum.

16. An article of manufacture according to claim 4, wherein the temperature information is a then current temperature, and the processing is performed in real time.

17. A controller for adjusting the focus of a radiation beam emitted by a radiation generator at an imaging medium, comprising:

a communications interface operable to receive an information signal representing temperature information; and a processor programmed to process the received information signals to generate a control signal for controlling a focus element through which the emitted beam passes so as to correspond to the temperature information;

wherein the communications interface is further operable to transmit the control signal to the focus element.

18. A controller according to claim 17, further comprising:

a memory configured to store an algorithm;

wherein the processor is further programmed to retrieve the stored algorithm and to process the received information signal in accordance the retrieved algorithm to generate the control signal.

19. A controller according to claim 17, further comprising:

a memory configured to store a look-up table;

wherein the processor is further programmed to access the stored look-up table to identify adjustment data corresponding to the temperature information and to generate the control signal based on the identified adjustment data.

20. A controller according to claim 17, wherein the information signal is one of multiple information signals and the communications interface is further operable to receive the multiple information signals from multiple different temperature sensors.

21. A controller according to claim 17, wherein the focus element includes a focus adjustment mechanism, the controller is further programmed to generate the control signal to control the focus adjustment mechanism, and the communications interface is operable to transmit the control signal to the focus adjustment mechanism.

22. A controller according to claim 17, wherein the temperature information is a then current temperature, and the processor is further programmed to automatically generate the control signal after receipt of the information signal.

23. A method of operating a computer to adjust the focus of a radiation beam emitted by a radiation generator at an imaging medium, comprising the steps:

inputting temperature information, processing the input temperature information to generate control information for controlling a focus element through which the emitted beam passes to adjust the beam focus at the imaging medium so as to correspond to the temperature information; and outputting the control information to the focus element.

24. A method according to claim 23, wherein the focus element includes a lens and the outputted control information is for controlling a movement of the lens.

25. A method according to claim 23, wherein the temperature information includes at least one detected temperature.

26. A method according to claim 24, wherein the temperature information includes a then current temperature, and the processing is performed in real time.

27. An article of manufacture according to claim 4, wherein the information signal representing temperature information includes at least one of a temperature of a first support member supporting the image medium during imaging, a temperature of a housing which houses the radiation generator, and a temperature of a second support member supporting a focus element.

28. A controller according to claim 17, wherein the temperature information includes at least one of a temperature of a first support member supporting the image medium during imaging, a temperature of a housing which houses the radiation generator, and a temperature of a second support member supporting the focus element.

29. A method according to claim 23, wherein the temperature information includes at least one of temperature of a first support member supporting the image medium during imaging, a temperature of a housing which houses the radiation generator, and a temperature of a second support member supporting the focus element.

* * * * *